(12) United States Patent
Okabe et al.

(10) Patent No.: US 8,246,734 B2
(45) Date of Patent: *Aug. 21, 2012

(54) WRITING INK COMPOSITION

(75) Inventors: Tomooki Okabe, Tokyo (JP); Akinori Tanaka, Tokyo (JP)

(73) Assignee: Zebra Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/663,683

(22) PCT Filed: Nov. 20, 2007

(86) PCT No.: PCT/JP2007/072464
§ 371 (c)(1),
(2), (4) Date: Dec. 8, 2009

(87) PCT Pub. No.: WO2009/066372
PCT Pub. Date: May 28, 2009

(65) Prior Publication Data
US 2010/0186623 A1   Jul. 29, 2010

(51) Int. Cl.
*C09D 11/16* (2006.01)
(52) U.S. Cl. .................................. 106/31.26
(58) Field of Classification Search ............. 106/31.26
See application file for complete search history.

(56) References Cited

U.S. PATENT DOCUMENTS

| | | | | |
|---|---|---|---|---|
| 5,746,815 A * | 5/1998 | Caputo | ...................... | 106/31.25 |
| 5,800,599 A * | 9/1998 | Asada | ........................ | 106/31.26 |
| 6,527,842 B1 * | 3/2003 | Adams et al. | ............... | 106/31.26 |
| 2004/0147632 A1 | 7/2004 | Nakamura et al. | | |
| 2004/0214919 A1 | 10/2004 | Ikeda et al. | | |
| 2005/0234150 A1 | 10/2005 | Omatsu et al. | | |
| 2007/0213443 A1 | 9/2007 | Fine et al. | | |
| 2008/0196622 A1 * | 8/2008 | Zhu | ............................ | 106/31.26 |

FOREIGN PATENT DOCUMENTS

| | | |
|---|---|---|
| EP | 000845509 A1 * | 6/1998 |
| GB | 2 379 222 | 3/2003 |
| JP | 60-181179 | 9/1985 |
| JP | 10-158568 | 6/1998 |
| JP | 2001-26730 | 1/2001 |
| JP | 2001-205974 | 7/2001 |
| JP | 2004-115611 | 4/2004 |
| WO | WO-03/006564 | 1/2003 |

OTHER PUBLICATIONS

European Search Report dated Oct. 6, 2010, directed to counterpart European Application No. 07832194; 6 pages.
International Preliminary Report on Patentability issued on Jun. 8, 2010 directed to PCT/JP2007/072464; 6 pages.
International Search Report mailed Dec. 25, 2007, directed to counterpart application No. PCT/JP2007/072464; 1 page.
Japanese Office Action mailed Mar. 27, 2012, directed to Japanese Patent Application No. 2006-161205; 3 pages (partial English translation).

* cited by examiner

*Primary Examiner* — Melvin C Mayes
*Assistant Examiner* — Veronica F Faison
(74) *Attorney, Agent, or Firm* — Morrison & Foerster LLP

(57) ABSTRACT

The writing ink composition of the present invention includes: an oil-based component containing a polar solvent and a spinnability imparting agent; and a water-based component containing water, polyhydric alcohol, a thixotropy imparting agent and a pigment, the water-based component being dispersed in the above oil-based component.

7 Claims, 1 Drawing Sheet

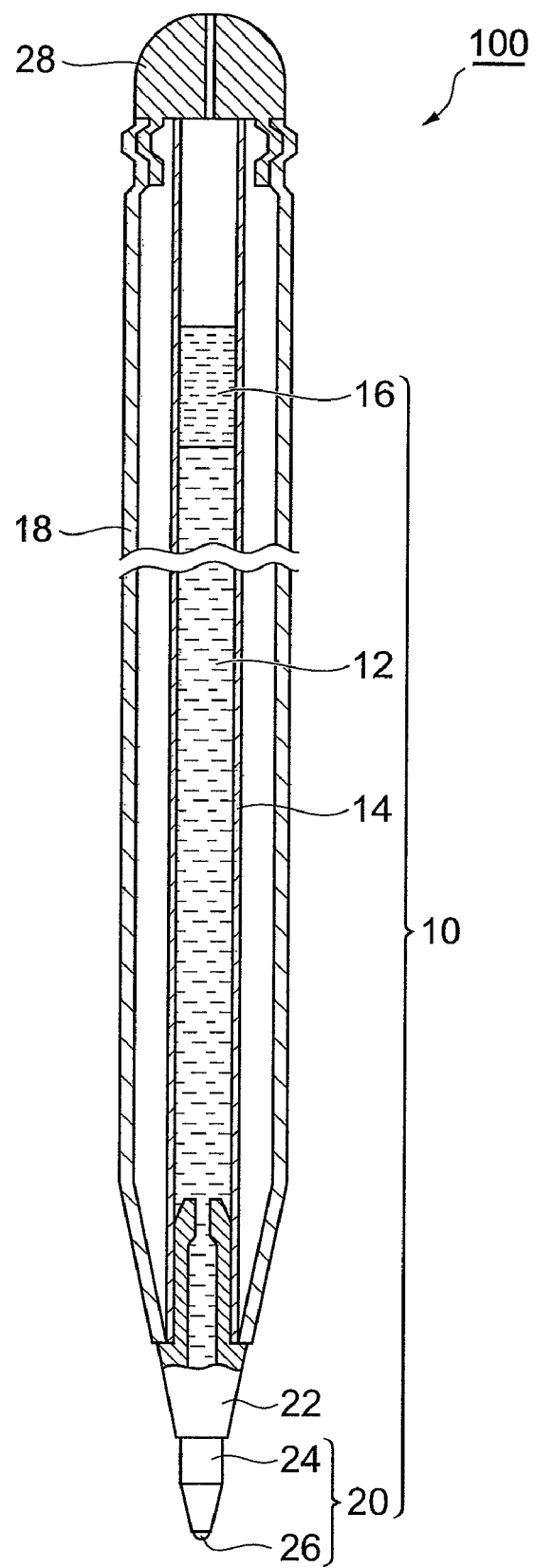

WRITING INK COMPOSITION

REFERENCE TO RELATED APPLICATIONS

This application is a national stage application under 35 USC 371 of International Application No. PCT/JP2007/072464, filed Nov. 20, 2007, the contents of both of which are incorporated herein by reference.

FIELD OF THE INVENTION

The present invention relates to a writing ink composition.

BACKGROUND OF THE INVENTION

Dyes have been widely used as colorants for oil-based ballpoint pen inks. In cases where dyes are used as colorants, however, the writing produced with such inks tends to have poor light resistance. To improve the light resistance of writing, the dispersion of a pigment in an oil-based ballpoint pen ink has been studied. Dispersing a pigment in an oil-based ballpoint pen ink, however, causes some other problems. For example, writing becomes difficult or the ball seat becomes worn because of pigment settling or aggregation occurring with time.

To overcome such problems caused by the use of pigments, particularly to suppress the wear of the ball seat, Patent Document 1, for example proposes an ink composition wherein a pigment is dispersed in an oil-based component in advance and then a water-based component containing a lubricant is solubilized in the oil-based component.

[Patent Document 1] Japanese Unexamined Patent Publication No. 2004-115611

SUMMARY OF THE INVENTION

However, in the ink composition described in the above patent document (Patent Document 1), the problems of the occurrence of pigment aggregation and the nonuniformity of pigment dispersion have not been fully solved; thus, its long-term stability remains problematic. And not only in Patent Document 1 but also in other documents, the suppression of ball seat wear has been studied in various ways. However, most of their proposals still pose the problem of increasing the viscosity of ink, thereby causing the degradation of smooth writing performance or the density of writing, although they suppress the wear of ball seat.

The present invention has been made in the light of the problems of conventional technology. Accordingly, it is an object of the present invention to provide a writing ink composition with which smooth writing performance, the light resistance of writing (fastness of writing), the density of writing and long-term stability can be all accomplished at a high level.

To achieve the above object, the present invention provides a writing ink composition that includes: an oil-based component containing a polar solvent and a spinnability imparting agent; and a water-based component containing water, polyhydric alcohol, a thixotropy imparting agent and a pigment, the water-based component being dispersed in the oil-based component.

Such a writing ink composition (hereinafter sometimes referred to as simply as "ink composition") can be prepared, as a W/O type emulsion ink where water droplets composed of a water-based component with a pigment dispersed therein are dispersed in a oil-based component, by adding a pigment to a water-based component in advance and mixing the water-based component with an oil-based component. This ink composition contains a pigment, thereby being able to produce a clear and highly light-resistant writing. This ink composition includes an oil-based component and a water-based component in the above composition, thereby being able to fully suppress the settling or aggregation of the pigment, provide good long-term stability, and suppress the wear of the ball seat due to the pigment. Besides, the ink composition is provided with thixotropy by adding a thixotropy imparting agent to the water-based component, thereby being able to show a high ink viscosity when leaving the ballpoint pen at rest and a decreased ink viscosity when writing. This realizes smooth writing performance and sufficient density of writing while keeping the long-term stability good. Furthermore, the ink composition includes a water-based component, thereby being able to prevent the occurrence of strike through even with a low viscosity and to suppress the ink bleeding on the metal surface of the pen tip or the ink drops on the paper. The reason that the ink bleeding or the ink drops on the paper can be suppressed may be that the ink's wettability on the metal surface is controlled so that it falls in the proper range by mixing the oil-based component which contains a polar solvent wettable on the metal surface and the water-based component which contains water apt to be repelled on the metal surface.

In the writing ink composition of the present invention, preferably the above water-based component further contains a pigment dispersant. Adding a pigment dispersant to the water-based component raises the dispersion of the pigment, whereby the pigment settling or aggregation occurring with time can be more sufficiently suppressed.

In the writing ink composition of the present invention, preferably the above water-based component further contains a lubricant. Adding a lubricant to the water-based component enables the wear of the ball seat caused by the pigment to be more fully suppressed. Even in cases where a lubricant is used, the ink composition of the present invention composed as described above can fully suppress the pigment aggregation, and therefore, it can have good long-term stability.

In the writing ink composition of the present invention, preferably the above oil-based component further contains an oil-soluble dye. Adding an oil-soluble dye to the oil-based component enables writing to be denser and clearer.

In the writing ink composition of the present invention, preferably the content ratio of the above oil-based component to the above water-based component is within the range of 6:4 to 7:3 based on the mass ratio. If the content ratio of the oil-based component to the water-based component is within the above range, the smooth writing performance and the long-term stability can be made better, and besides, the patchy of writing, bleeding or the occurrence of ink drops can be suppressed more sufficiently.

In the writing ink composition of the present invention, preferably the content of the above spinnability imparting agent is 0.5 to 3.0% by mass on the basis of the total mass of the writing ink composition. If the content of the spinnability imparting agent is within the above range, the emulsion can be made more stable, thereby making the long-term stability much better, and, at the same time, the ink is allowed to have moderate viscoelasticity, thereby being able to realize smoother writing performance. In addition, the occurrence of ink drops when writing or the occurrence of an ink spill when leaving the ballpoint pen at rest can be more fully suppressed.

In the writing ink composition of the present invention, preferably the content of the above thixotropy imparting agent is 0.1 to 2.0% by mass on the basis of the total mass of the writing ink composition. If the content of the thixotropy imparting agent is within the above range, the ink composition is allowed to have moderate thixotropy, whereby smoother writing performance can be realized. In addition, the emulsion can be more stabilized.

According to the present invention, a writing ink composition can be provided with which smooth writing performance, the light resistance (fastness) of writing, the density of writing and long-term stability can all be realized at a high level.

BRIEF DESCRIPTION OF THE DRAWINGS

FIG. 1 is a schematic cross sectional view showing one embodiment of the ballpoint pen of the present invention.

EXPLANATION OF REFERENCE NUMERALS

10 . . . Core, 12 . . . Ink composition, 14 . . . Ink accommodating tube, 16 . . . Reverse-flow prevention member, 18 . . . Body shaft, 20 . . . Ballpoint pen tip, 22 . . . Joint, 24 . . . Ball holder, 26 . . . Ball, 28 . . . Breech block, 100 . . . Ballpoint pen

DETAILED DESCRIPTION OF THE INVENTION

Preferred embodiments of the present invention will be hereinbelow described in detail with reference to the accompanying drawing. The same symbols designate identical or corresponding parts in the drawing, and the repetition of the description on such parts will be omitted.

The writing ink composition of the present invention includes: an oil-based component containing a polar solvent and a spinnability imparting agent; and a water-based component containing water, polyhydric alcohol, a thixotropy imparting agent and a pigment, the water-based component being dispersed in the above oil-based component. Each of the components that composes the ink composition will be described below.

The oil-based component contains at least a polar solvent and a spinnability imparting agent. Any polar solvents that are used in writing oil-based inks can be used as the polar solvent without particular limitation. Concrete examples of such polar solvents include: glycol ethers such as ethylene glycol monophenyl ether, propylene glycol monophenyl ether, propylene glycol dipropylene glycol monomethyl ether, dipropylene glycol monoethyl ether, dipropylene glycol monobutyl ether and tripropylene glycol monomethyl ether; and alcohols such as benzyl alcohol, ethylene glycol, triethylene glycol, propylene glycol and polyethylene glycol. These solvents may be used alone or in combination of two or more. Preferably the content of the polar solvent in the oil-based component is 20 to 60% by mass based on the total mass of the ink composition and more preferably 30 to 50% by mass.

Examples of spinnability imparting agents include polyvinyl pyrrolidone, polyvinyl alcohol, polyethylene oxide and hydroxypropyl cellulose. These spinnability imparting agents may be used alone or in combination of two or more. The use of a spinnability imparting agent enables the prevention of ink drops when writing or the ink spill when leaving the ballpoint pen at rest. The use of a spinnability imparting agent also produces the effect of stabilizing the emulsion, and besides, it produces the effect of smoothing writing performance because it can provide ink with a moderate viscoelasticity.

Preferably the content of the spinnability imparting agent is 0.5 to 3.0% by mass based on the total mass of the ink composition and more preferably 1.0 to 2.0% by mass. If the content is less than 0.5% by mass, the ink drops when writing or the ink spill when leaving the ballpoint pen at rest tends to occur more often. If the content is more than 3.0% by mass, the viscosity of the ink composition is increased, whereby the patchy of writing tends to occur or the smooth writing performance tends to degrade.

Preferably the oil-based component further contains an oil-soluble dye. Any known oil-soluble dyes can be used as the oil-soluble dye without particular limitation. Examples of oil-soluble dyes include direct dyes, acid dyes and basic dyes. More specifically, they include SPIRIT BLACK 61F, VALIFAST VIOLET 1701, VALIFAST VIOLET 1704, VALIFAST YELLOW 1109, VALIFAST BLUE 1605, VALIFAST BLUE 1621, VALIFAST BLUE 1623, VALIFAST RED 1320, VALIFAST RED 1360, VALIFAST RED 2320 (so far manufactured by Orient Chemical Industries Co., Ltd.), AIZEN SPILON BLACK GMH SPECIAL, AIZEN SPILON VIOLET C-RH, AIZEN SPILON YELLOW C-GH NEW, AIZEN SPILON BLUE C-RH, AIZEN SPILON S.P.T. BLUE-111, AIZEN SPILON S.P.T. BLUE-121 (all manufactured by Hodogaya Chemical Co., Ltd.). These dyes may be used alone or in combination of two or more. The use of an oil-soluble dye enables writing to be dense and clear. In the ink composition of the present invention, the viscosity can be modified by the addition of an oil-soluble dye, even if no viscosity modifying resin is added.

Preferably the content of the oil-soluble dye is 20 to 50% by mass based on the total mass of the ink composition and more preferably 25 to 40% by mass. If the content is less than 20% by mass, the clearness of writing tends to deteriorate. If the content is more than 50% by mass, the viscosity of the ink composition is increased, whereby the smooth writing performance degrades and the oil-soluble dye is more likely to settle with time.

Besides the above ingredients, the oil-based component may further contain other additives. Examples of such additives include viscosity modifiers (resin etc.), lubricants, pigments and antioxidants.

Examples of the viscosity modifiers usable include ketone resin, sulfamide resin, maleic resin, xylene resin, amide resin, alkyd resin, phenol resin, rosin resin, terpene resin and butyral resin.

Examples of the lubricant usable include higher fatty acids such as oleic acid and phosphoric acid ester lubricants.

Examples of the pigments usable include carbon black, and common organic pigments such as insoluble azo, azo lake, condensation azo, diketopyrrolopyrrole, phthalocyanine, quinacridone, anthraquinone, dioxazine, indigo, thioindigo, quinophthalone, threne and isoindolinone pigments.

The water-based component contains at least water, polyhydric alcohol, a thixotropy imparting agent and a pigment. While conventional low-viscosity oil-based ink composition has the problem of writing ink being apt to penetrate into paper, thereby being likely to cause strike through, the ink composition of the present invention contains water, thereby being able to prevent the occurrence of strike through. The content of water is preferably 5 to 30% by mass based on the total mass of the ink composition and more preferably 10 to 20% by mass. If the content is less than 5% by mass, the smooth writing performance tends to deteriorate. If the content is more than 30% by mass, the long-term stability tends to be lowered.

Examples of the polyhydric alcohols usable include ethylene glycol, propylene glycol, glycerin, diethylene glycol and polyethylene glycol. These polyhydric alcohols may be used alone or in combination of two or more. The use of a polyhydric alcohol makes it possible to keep the emulsion stable.

The content of the polyhydric alcohol is preferably 5 to 30% by mass based on the total mass of the ink composition and more preferably 10 to 20% by mass. If the content is less than 5% by mass, the stability of the emulsion tends to be lowered. If the content is more than 30% by mass, the viscosity of the ink composition is increased, thereby causing not only the deterioration of the smooth writing performance but also the patchy of writing.

Examples of the thixotropy imparting agents usable include xanthan gum, locust bean gum, welan gum, gellan gum, guar gum, pectin, carrageenan, carboxyvinyl polymer, gum arabic, tragacanth gum, rhamsan gum, gelatin, sodium alginate and carboxymethyl cellulose. These thixotropy imparting agents may be used alone or in combination of two or more. The use of a thixotropy imparting agent imparts thixotropy to the ink composition, thereby producing the effect of realizing smooth writing performance. It also produces the effect of stabilizing the emulsion.

The content of the thixotropy imparting agent is preferably 0.1 to 2.0% by mass based on the total mass of the ink composition and more preferably 0.1 to 0.5% by mass. If the content is less than 0.1% by mass, the thixotropy of the ink composition tends to degrade, thereby causing the deterioration of the smooth writing performance. If the content is more than 2.0% by mass, the viscosity of the ink composition tends to be increased, thereby causing the deterioration of the smooth writing performance.

Examples of the pigments usable include any known pigments, without particular limitation. Concrete examples of such pigments include carbon black, and common organic pigments such as insoluble azo, azo lake, condensation azo, diketopyrrolopyrrole, phthalocyanine, quinacridone, anthraquinone, dioxazine, indigo, thioindigo, quinophthalone, threne and isoindolinone pigments. These pigments may be used alone or in combination of two or more. The use of a pigment enables not only dense and clear writing but also sufficiently light-resistant writing.

The content of the pigment is preferably 0.5 to 10% by mass based on the total mass of the ink composition and more preferably 1 to 5% by mass. If the content is less than 0.5% by mass, the density, clearness and light resistance of writing tends to decrease. If the content is more than 10% by mass, the long-term stability tends to deteriorate, making the aggregation or settling of the pigment likely to occur.

Preferably the water-based component further contains a pigment dispersant. Any pigment dispersant may be used as the pigment dispersant in the water-based component without particular limitation as long as it is capable of dispersing the above pigment. Examples of such pigment dispersants include: water-soluble resins prepared by homopolymerizing any one of acrylic acid or the esters thereof, methacrylic acid or the esters thereof and maleic acid or the esters thereof or copolymerizing the same with styrene, acrylonitrile or vinyl acetate and then neutralizing the polymer with an alkali metal or amine; anionic surfactants; and nonionic surfactants. Of these pigment dispersants, water-soluble resins are preferable and styrene-maleic acid copolymers are particularly preferable. These pigment dispersants may be used alone or in combination of two or more. The use of a pigment dispersant enables the suppression of pigment settling or aggregation which occurs with time, thereby providing good long-term stability.

The content of the pigment dispersant is preferably 0.5 to 5.0% by mass based on the total mass of the ink composition and more preferably 1.0 to 2.0% by mass. If the content is less than 0.5% by mass, the aggregation or settling of the pigment tends to occur with time. If the content is more than 5.0% by mass, the viscosity of the ink composition tends to be increased, thereby causing the deterioration of the smooth writing performance.

Preferably the water-based component further contains a lubricant. Examples of the lubricant usable include polyalkylene glycol derivatives, fatty acid salts, nonionic surfactants and phosphoric acid esters. Of these lubricants, fatty acid salts are preferable, and potassium oleate is particularly preferable. These lubricants may be used alone or in combination of two or more. The use of such a lubricant enables the suppression of the wear of the ball seat, which is caused by the pigment.

The content of the lubricant is preferably 0.1 to 3.0% by mass based on the total mass of the ink composition and more preferably 0.3 to 1.0% by mass. If the content is less than 0.1% by mass, the effect of suppressing the ball seat wear tends to be decreased. If the content is more than 3.0% by mass, the long-term stability of the ink composition tends to be lowered.

Besides the above ingredients, the water-based component may further contain other additives. Examples of such additives include anti-corrosives, anti-bacterial agents, moisture-retention agents, water-soluble dyes and pH adjusters.

Examples of the anti-corrosives usable include benzotriazole, tolyltriazole, octyl phosphate, imidazole, benzoimidazole and ethylenediaminetetraacetic acid salts.

Examples of the anti-bacterial agents usable include pentachlorophenol sodium, sodium benzoate, potassium sorbate, sodium dehydroacetate, 1,2-benzisothiazolin-3-one, 2,4-thiazolylbenzimidazole and paraoxybenzoic acid ester.

Examples of the moisture-retention agents usable include urea, thiourea and ethyleneurea.

Examples of the water-soluble dyes usable include direct dyes, acid dyes and basic dyes. Examples of such direct dyes, in terms of Color Index Number, include Color Index (hereinafter abbreviation C.I. will be used) Direct Black 17, C.I. Direct Black 19, C.I. Direct Black 38, C.I. Direct Black 154, C.I. Direct Yellow 1, C.I. Direct Yellow 4, C.I. Direct Yellow 12, C.I. Direct Yellow 29, C.I. Direct Orange 6, C.I. Direct Orange 8, C.I. Direct Orange 26, C.I. Direct Orange 29, C.I. Direct Red 1, C.I. Direct Red 2, C.I. Direct Red 4, C.I. Direct Red 13, C.I. Direct Blue 2, C.I. Direct Blue 6, C.I. Direct Blue 15, C.I. Direct Blue 78 and C.I. Direct Blue 87. Examples of such acid dyes include C.I. Acid Black 2, C.I. Acid Black 31, C.I. Acid Yellow 3, C.I. Acid Yellow 17, C.I. Acid Yellow 23, C.I. Acid Yellow 73, C.I. Acid Orange 10, C.I. Acid Red 13, C.I. Acid Red 14, C.I. Acid Red 18, C.I. Acid Red 27, C.I. Acid Red 52, C.I. Acid Red 73, C.I. Acid Red 87, C.I. Acid Red 92, C.I. Acid Blue 1, C.I. Acid Blue 9, C.I. Acid Blue 74 and C.I. Acid Blue 90. Examples of basic dyes include C.I. Basic Yellow 2, C.I. Basic Yellow 3, C.I. Basic Red 1, C.I. Basic Red 2, C.I. Basic Red 8, C.I. Basic Red 12, C.I. Basic Violet 1, C.I. Basic Violet 3, C.I. Basic Violet 10, C.I. Basic Blue 5, C.I. Basic Blue 9 and C.I. Basic Blue 26.

Examples of the pH adjusters usable include triethanolamine, diethanolamine, monoethanolamine, ammonia water, sodium hydroxide, potassium hydroxide, sodium carbonate and sodium hydrogen carbonate.

The ink composition of the present invention can be obtained as a W/O type emulsion ink, in which water droplets composed of a water-based component are dispersed in an oil-based component, by mixing the above oil-based component and water-based component.

If the diameter of the water droplets dispersed in the oil-based component is too small, the smooth writing performance tends to degrade. Accordingly, for example when the average water droplet diameter is defined as the average value of ten randomly selected measurements of water droplets in the ink composition observed under the optical microscope, the average water droplet diameter is preferably 0.1 to 10.0 μm and more preferably 1.0 to 6.0 μm. If the average diameter of the water droplets is within the above range, particularly smooth writing performance can be realized. The average diameter of the water droplets can be controlled chiefly by changing the mixing conditions of the oil-based component and the water-based component. The average diameter of the water droplets can also be controlled by changing the compositions of the oil-based component and the water-based component.

In the ink composition of the present invention, the content ratio of the oil-based component to the water-based component (oil-based component: water-based component) is preferably within the range of 6:4 to 7:3 on the basis of mass ratio. If the ratio is so large that it becomes outside the above range, the conditions of the ink composition become close to those of conventional oil-based ink. As a result, the smooth writing performance tends to degrade, and besides, the patchy of writing, the bleeding of ink or ink drops on paper tends to occur. If the ratio is so small that it becomes outside the above range, the smooth writing performance and long-term stability degrade and the patchy of writing tends to occur.

Mixing of the oil-based component and the water-based component can be carried out using an agitator such as dissolver, Henschel mixer and Homo mixer. There is no limitation to the agitating conditions. An emulsion ink in which water droplets having the above average diameter are uniformly dispersed in the oil-based component can be formed, for example, by agitating the above two components using a dissolver agitator at 100 to 1000 rpm for 30 to 180 min.

Preferably the viscosity of the ink composition of the present invention, when measured using cone CP40 at 25° C. and a shear rate of $0.75s^{-1}$, is 300 to 2500 mPa·s and more preferably 500 to 1500 mPa·s. If the viscosity is less than 300 mPa·s, the leakage (spill) of the ink composition is more likely to occur during the ballpoint pen being left at rest and the long-term stability tends to degrade. If the viscosity is more than 2500 mPa·s, the smooth writing performance tends to degrade.

In the following one embodiment of the ballpoint pen using the ink composition of the present invention will be described. FIG. 1 is a schematic cross sectional view showing the ballpoint pen according to the embodiment of the present invention. In a ballpoint pen 100, shown in FIG. 1, an ink accommodating tube 14 is filled with an ink composition 12. To one end of the ink accommodating tube 14, a ballpoint pen tip 20 is attached. The ballpoint pen tip 20 is composed of a ball holder 24 and a ball 26 and fixed to the ink accommodating tube 14 through a joint 22. A reverse-flow prevention member 16 is contained on the side opposite to the ballpoint pen tip 20 side in the ink accommodating tube 14 in such a manner as to be adjacent to the ink composition 12. The reverse-flow prevention member 16 is arranged so that no space is left between the reverse-flow prevention member 16 and the ink composition 12.

In the ballpoint pen 100, the ink accommodating tube 14, the ballpoint pen tip 20, the ink composition 12 and the reverse-flow prevention member 16 constitute a core 10. The core 10 is installed in a body shaft 18, and a breech block 28 having a vent is mounted on the rear end (one end on the side opposite to the ballpoint pen chip 20) of the body shaft 18.

The components of the ballpoint pen 100 will be described below. To the constitution of the components other than the ink composition 12, a common constitution used for ballpoint pens is applicable.

Any ink accommodating tube formed of a resin, such as polypropylene, polyethylene, polyethylene terephthalate, nylon, polyacetal or polycarbonate, or of a metal may be used as the ink accommodating tube 14. The ink accommodating tube 14 may take any shape without particular limitation. It can be produced, for example, in a cylindrical shape.

The reverse-flow prevention member 16 has the function of preventing the ink composition from flowing out (flow-out preventive properties), the function of preventing the ink composition from drying up (hermetically sealing properties), and the like. And any known reverse-flow prevention member having the above functions can be used as the reverse-flow prevention member 16 without particular limitation. The reverse-flow prevention member 16 includes, for example, a base oil and a thickening agent. Examples of such a base oil include mineral oil, polybutene, silicone oil, glycerin and polyalkylene glycol. Examples of such a thickening agent include metal-soap, organic or inorganic thickening agents.

To prevent the reverse-flow prevention member 16 from settling in the ink composition 12 when turning the ballpoint pen tip 20 downward, it is important to adjust the viscosity of the reverse-flow prevention member 16 or the difference in specific gravity between the ink composition 12 and the reverse-flow prevention member 16. It is also important to allow the reverse-flow prevention member 16 to have a composition incompatible with that of the ink composition 12.

Any body shaft and breech block formed of, for example, plastic materials such as polypropylene may be used as the body shaft 18 and the breech block 28.

Any joint formed of, for example, polypropylene, polyethylene, polyethylene terephthalate, nylon, polyacetal or polycarbonate may be used as the joint 22.

Any joint, ball holder and ball used in common ballpoint pens may be used as the joint 22, the ball holder 24 and the ball 26 in the ballpoint pen tip 20. The diameter of the ball 26 is Preferably 0.3 to 1.2 mm.

The ballpoint pen 100 of the present embodiment which has the constitution described above can be produced by any method for producing common ballpoint pens or the like.

While the ballpoint pen using the ink composition of the present invention has been described in terms of a preferred embodiment, the ballpoint pen is not limited to the embodiment. For example, the ballpoint pen using the ink composition of the present invention need not include the body shaft 18, and the ink accommodating tube 14 itself can be the body shaft. Further, the ballpoint according to the present invention may include a pressurizing mechanism that allows the ink composition 12 and the reverse-flow prevention member 16 in the ink accommodating tube 14 to be in a state where they are pressurized from their rear end side (one end opposite to the ballpoint pen tip 20). And the ballpoint pen according to the present invention need not include the reverse-flow prevention member 16.

The use of the ink composition of the present invention is not limited to ballpoint pens. The ink composition of the present invention has various applications, such as marking pens including brush pens and writing implements using a valve mechanism in their ink discharge portion.

EXAMPLES

The present invention will be described more specifically below based on Examples and Comparative Examples, and is not limited to these Examples.

Examples 1 to 5 and Comparative Examples 1 to 5

Oil-based components and water-based components were prepared separately by formulating the ingredients shown in Tables 1 to 3 below in amounts (part by mass) shown in the same and mixing with reciprocating rotary agitator. Then the water-based components were added to the respective oil-based components while agitating the oil-based components with dissolver agitator and agitation was continued for one hour at room temperature (25° C.), at 300 rpm, to yield W/O type emulsion ink compositions of Examples 1 to 5 and Comparative Examples 1 to 5 in which water droplets composed of the water-based components were dispersed in the respective oil-based components.

The details of the ingredients shown in Tables 1 to 3 were as follows.
Polyvinylpyrrolidone K-90 (trade name): manufactured by Nippon Shokubai Co., Ltd., spinnability imparting agent
Oleic acid: LUNAC O-LL (trade name), manufactured by Kao Corporation, lubricant
SPIRIT BLACK 61F (trade name): manufactured by Orient Chemical Industries Co., Ltd., oil-soluble dye
VALIFAST YELLOW 1109 (trade name): manufactured by Orient Chemical Industries Co., Ltd., oil-soluble dye
VALIFAST VIOLET 1704 (trade name): manufactured by Orient Chemical Industries Co., Ltd., oil-soluble dye
Xanthan gum: Monat Gum GS (trade name), manufactured by Dainippon Pharma Co., Ltd., thixotropy imparting agent
Welan gum: KELCO-CRETE (K1C376) (trade name), manufactured by Sansho Co., Ltd., thixotropy imparting agent
Locust bean gum: GENUGUM type RL-200-J (trade name), manufactured by Sansho Co., Ltd., thixotropy imparting agent
Carboxy vinyl polymer: Carbopol 941 (trade name), manufactured by BFGoodrich Company, thixotropy imparting agent
Anti-corrosive: Corromin CB (trade name), manufactured by Chelest Corporation
Anti-bacterial agent: Thrauto 99N (trade name), manufactured by Japan EnviroChemicals, Ltd.
Potassium oleate: Nonsal OK-1 (trade name), manufactured by NOF Corporation
Pigment dispersant (styrene-maleic acid copolymer): SMA1000H Solution (trade name), manufactured by Sartomer Company, Inc.
AIZEN SPILON BLACK GMH (trade name): manufactured by Hodogaya Chemical Co., LTD., oil-soluble dye
VALIFAST VIOLET 1701 (trade name): manufactured by Orient Chemical Industries Co., Ltd., oil-soluble dye
Ketone resin: Synthetic Resin SK (trade name), manufactured by HUELS AG

TABLE 1

|  |  | Examples | | | | |
| --- | --- | --- | --- | --- | --- | --- |
|  |  | 1 | 2 | 3 | 4 | 5 |
| Oil-based component | Ethylene glycol monophenyl ether | 30.5 | 30.5 | 30.5 | 30.5 | 26.1 |
|  | Benzyl alcohol | 8.0 | 8.0 | 8.0 | 8.0 | 6.9 |
|  | Polyvinylpyrrolidone K-90 | 1.0 | 1.0 | 1.0 | 1.0 | 0.9 |
|  | Oleic acid | 1.5 | 1.5 | 1.5 | 1.5 | 1.3 |
|  | SPILIT BLACK 61F | 8.0 | 8.0 | 8.0 | 8.0 | 6.9 |
|  | VALIFAST YELLOW 1109 | 6.0 | 6.0 | 6.0 | 6.0 | 5.1 |
|  | VALIFAST VIOLET 1704 | 15.0 | 15.0 | 15.0 | 15.0 | 12.9 |
| Water-based component | Ion-exchanged water | 14.1 | 14.1 | 14.1 | 14.1 | 18.7 |
|  | Glycerin | 6.0 | 6.0 | 6.0 | 6.0 | 8.0 |
|  | Ethylene glycol | 4.0 | 4.0 | 4.0 | 4.0 | 5.3 |
|  | Xanthan gum | 0.2 | — | — | — | 0.3 |
|  | Welan gum | — | 0.2 | — | — | — |
|  | Locust bean gum | — | — | 0.2 | — | — |
|  | Carboxy vinyl polymer | — | — | — | 0.2 | — |
|  | Anti-corrosive | 0.5 | 0.5 | 0.5 | 0.5 | 0.7 |
|  | Anti-bacterial agent | 0.5 | 0.5 | 0.5 | 0.5 | 0.7 |
|  | Potassium oleate | 0.8 | 0.8 | 0.8 | 0.8 | 1.0 |
|  | Pigment dispersant | 1.5 | 1.5 | 1.5 | 1.5 | 2.0 |
|  | Carbon black | 2.5 | 2.5 | 2.5 | 2.5 | 3.3 |

TABLE 2

|  |  | Comparative Examples | | | |
| --- | --- | --- | --- | --- | --- |
|  |  | 1 | 2 | 3 | 4 |
| Oil-based component | Ethylene glycol monophenyl ether | 31.5 | 30.5 | 30.5 | 30.5 |
|  | Benzyl alcohol | 8.0 | 8.0 | 8.0 | 8.0 |
|  | Polyvinylpyrrolidone K-90 | — | 1.0 | 1.0 | 1.0 |
|  | Oleic acid | 1.5 | 1.5 | 1.5 | 1.5 |
|  | SPILIT BLACK 61F | 8.0 | 8.0 | 8.0 | 8.0 |
|  | VALIFAST YELLOW 1109 | 6.0 | 6.0 | 6.0 | 6.0 |
|  | VALIFAST VIOLET 1704 | 15.0 | 15.0 | 15.0 | 15.0 |
| Water-based component | Ion-exchanged water | 14.1 | 14.3 | 24.1 | 18.1 |
|  | Glycerin | 6.0 | 6.0 | — | 6.0 |
|  | Ethylene glycol | 4.0 | 4.0 | — | 4.0 |
|  | Xanthan gum | 0.2 | — | 0.2 | 0.2 |
|  | Anti-corrosive | 0.5 | 0.5 | 0.5 | 0.5 |
|  | Anti-bacterial agent | 0.5 | 0.5 | 0.5 | 0.5 |
|  | Potassium oleate | 0.8 | 0.8 | 0.8 | 0.8 |
|  | Pigment dispersant | 1.5 | 1.5 | 1.5 | — |
|  | Carbon black | 2.5 | 2.5 | 2.5 | — |

TABLE 3

|  |  | Comparative Example 5 |
| --- | --- | --- |
| Oil-based component | Ethylene glycol monophenyl ether | 24.5 |
|  | Nonionic surfactant (polyoxyethylene sorbitan triolate) | 1.5 |
|  | AIZEN SPILON BLACK GMH SPECIAL | 15.0 |
|  | VALIFAST VIOLET 1701 | 15.0 |
|  | Carbon black | 2.0 |
| Water-based component | Ion-exchanged water | 5.0 |
|  | Diethylene glycol monoethyl ether | 24.5 |
|  | Ketone resin | 10.0 |
|  | Polyvinylpyrrolidone K-90 | 0.5 |
|  | Phosphoric acid ester surfactant (alkylphenol ether phosphoric acid ester) | 2.0 |

[Measurement of Viscosity]
The ink compositions obtained in Examples 1 to 5 and Comparative Examples 1 to 5 were measured for their viscosity using an E type viscometer (manufactured by BROOKFIELD, cone: CP40) under the following conditions: at a temperature of 25° C., a shear rate of 0.75 s$^{-1}$. The results are shown in Tables 4 to 5.

[Measurement of Water Droplet Diameter]
The ink compositions obtained in Examples 1 to 5 and Comparative Examples 1 to 5 were observed for the dispersion state of the water-based component in the oil-based component using an optical microscope (magnifying power: 250). And the diameter of the water droplets made up of the water-based component was measured using the micrographs taken. The diameter of 10 water droplets randomly selected was measured and the average value was calculated as an average droplet diameter. The results are shown in Tables 4 to 5.

[Fabrication of Ballpoint Pen]

Each of the ink compositions obtained in Examples 1 to 5 and Comparative Examples 1 to 5 was held in the cylindrical polypropylene ink accommodating tube (inside diameter: 4.0 mm) of each ballpoint pen, the same type as shown in FIG. 1, with ballpoint pen tip (ball diameter: 0.7 mm) on its tip. Then, a reverse-flow prevention member consisting of 95% by mass refined mineral oil and 5% by mass thickening agent (metal soap, elastomer) was placed in the ink accommodating tube on the opposite side to the ballpoint pen tip (on the ink composition rear end side) in such a manner as to be adjacent to the above ink composition. Then, a breech block was fitted on the rear end of the body shaft of the ballpoint pen, and thus, ballpoint pens were fabricated.

[Evaluation of Smooth Writing Performance]

The ballpoint pens fabricated as above were used for freehand writing and evaluated for their smooth writing performance based on the following criteria. The results are shown in Tables 4 to 5.
- A: Very smooth
- B: Smooth
- C: Heavy

[Evaluation of Writing Density]

The ballpoint pens fabricated as above were used for freehand and constant pressure writing and evaluated for their writing density based on the following criteria. The results are shown in Tables 4 to 5.
- A: Very dense and clear
- B: Dense and clear
- C: Faint and unclear

[Evaluation of Writing Fastness (Light Resistance)]

The ballpoint pens fabricated as above were used for freehand and constant pressure writing. The written lines and blue scale were exposed to direct sunlight. And the fading of the written lines when fading of blue scale was observed on the 3rd grade scale was relatively estimated by comparing them with the written lines kept out of the sun. And the writing fastness was visually evaluated based on the following criteria. The results are shown in Tables 4 to 5.
- A: Not faded
- B: Slightly faded
- C: Faded

[Evaluation of Writing Patchy]

The ballpoint pens fabricated as above were used for writing loops with freehand and constant pressure, and evaluated for their writing patchy visually based on the following criteria. The results are shown in Tables 4 to 5.
- A: No patchy occurring and written lines being very clear
- B: Patchy hardly occurring and writing being clear
- C: Patchy occurring and writing being unclear

[Evaluation of Bleeding and Ink Drops]

The ballpoint pens fabricated as above were used for writing loops with a writing tester (writing angle: 70°, load: 200 g, writing rate: 4 m/min), and evaluated for the state of the written lines (ink drops) and the degree of the ink deposition (bleeding) on the pen tips visually based on the following criteria. The results are shown in Tables 4 to 5. The term "ink drops" means the state in which the ink is not in contact with paper accumulates on the pen tip little by little and drops on the paper to get written lines stained.
- A: No ink drops observed and no ink depositing on the pen tip
- B: A small degree of ink drops observed and a small amount of ink depositing on the pen tip
- C: Conspicuous ink drops and a large amount of ink deposits on the pen tip

[Evaluation of Strike Through]

The ballpoint pens fabricated as above were used for freehand and constant pressure writing on report paper (report pad, size: semi B5, B-ruled: 6 mm, manufactured by PLUS Corporation), and the written lines were visually evaluated for their strike through by observing the back of the paper based on the following criteria. The results are shown in Tables 4 to 5.
- A: No strike-through observed
- B: Slight strike-through observed
- C: Conspicuous strike-through observed

[Evaluation of Long-Term Stability]

The ballpoint pens fabricated as above were left at rest with their pen tips down in the environment of 60° C. and 0% RH. The ballpoint pens in such a state were evaluated for long-term stability based on the following criteria. The results are shown in Tables 4 to 5.
- A: Writing possible even after 90 days or more have elapsed
- B: Writing possible even after 60 days or more and less than 90 days have elapsed.
- C: Writing difficult after less than 60 days have elapsed.

TABLE 4

| | Examples | | | | |
|---|---|---|---|---|---|
| | 1 | 2 | 3 | 4 | 5 |
| Water droplet diameter (μm) | 1.2 | 2.0 | 2.0 | 4.0 | 1.5 |
| Viscosity (mPa·s) | 900 | 1100 | 1300 | 1200 | 1000 |
| Smooth writing performance | A | A | B | B | A |
| Writing density | A | A | A | A | A |
| Writing fastness | A | A | A | A | A |
| Writing patchy | A | A | A | B | A |
| Bleeding and ink drops | A | B | B | A | A |
| Strike through | A | A | A | A | A |
| Long-term stability | A | B | B | B | A |

TABLE 5

| | Comparative Examples | | | | |
|---|---|---|---|---|---|
| | 1 | 2 | 3 | 4 | 5 |
| Water droplet diameter (μm) | 2.0 | 1.5 | 2.0 | 1.5 | 0.05 |
| Viscosity (mPa·s) | 600 | 800 | 700 | 800 | 2800 |
| Smooth writing performance | C | C | B | B | C |
| Writing density | A | A | A | C | A |
| Writing fastness | A | A | A | C | A |
| Writing patchy | A | A | B | B | C |
| Bleeding and ink drops | C | B | B | A | B |
| Strike through | B | A | A | A | A |
| Long-term stability | C | C | C | B | C |

The results shown in Tables 4 to 5 apparently confirmed that the ink compositions of the present invention (Examples 1 to 5), compared with those of Comparative Examples 1 to 5, were capable of achieving the following characteristics: smooth writing performance, the density of writing, the fastness of writing, the patchy of writing, bleeding/ink drops, strike through and long-term stability at a higher level in a well-balanced manner. The ink composition of Comparative Example 1 could not realize smooth writing performance; caused bleeding/ink drops, and was inferior in long-term stability, because it did not contain a spinnability imparting agent. The ink composition of Comparative Example 2 could not realize smooth writing performance and was inferior in long-term stability, because it did not contain a thixotropy imparting agent. The ink composition of Comparative Example 3 was inferior in long-term stability, because it did not contain a polyhydric alcohol. The ink composition of Comparative Example 4 could not realize clear writing and was inferior in light resistance, because it did not contain a pigment. In the ink composition of Comparative Example 5, which was prepared according to Example 1 described in Patent Document 1, the aggregation of carbon black was observed with time and the composition was inferior in long-term stability, and besides, it could not realize smooth writing performance. One of the reasons the ink composition of Comparative Example 5 had poor characteristics may be that the water droplet diameter was too small.

As described so far, according to the present invention, a writing ink composition can be provided with which smooth writing performance, the light resistance (fastness) of writing, the density of writing and long-term stability can be all realized at a high level.

The invention claimed is:

1. A writing ink composition, comprising:
   (a) an oil-based component containing a polar solvent and at least one spinnability imparting agent selected from the group consisting of polyvinyl pyrrolidone, polyvinyl alcohol, polyethylene oxide and hydroxypropyl cellulose, and an oil-soluble dye; and
   (b) a water-based component containing water, polyhydric alcohol, at least one thixotropy imparting agent selected from the group consisting of xanthan gum, locust bean gum, welan gum, gellan gum, guar gum, pectin, carrageenan, carboxyvinyl polymer, gum arabic, tragacanth gum, rhamsan gum, gelatin, sodium alginate and carboxymethyl cellulose, and a pigment, the water-based component being dispersed in the oil-based component.

2. The writing ink composition according to claim 1, wherein the water-based component further contains a pigment dispersant.

3. The writing ink composition according to claim 1, wherein the water-based component further contains a lubricant.

4. The writing ink composition according to claim 1, wherein the content ratio of the oil-based component to the water-based component is within the range of 6:4 to 7:3 on the basis of mass ratio.

5. The writing ink composition according to claim 1, wherein the content of the spinnability imparting agent is 0.5 to 3.0% by mass on the basis of the total mass of the writing ink composition.

6. The writing ink composition according to claim 1, wherein the content of the thixotropy imparting agent is 0.1 to 2.0% by mass on the basis of the total mass of the writing ink composition.

7. the writing ink composition according to claim 1, wherein the polar solvent is glycol ethers or alcohols.

\* \* \* \* \*